(12) United States Patent
Wehler et al.

(10) Patent No.: US 7,452,026 B2
(45) Date of Patent: Nov. 18, 2008

(54) SLIDING DOOR SYSTEM FOR A VEHICLE, IN PARTICULAR A MOTOR VEHICLE

(75) Inventors: Herbert Wehler, Neunkirchen (DE); Uwe Kemper, Kreutzal (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 10/582,371

(22) PCT Filed: Dec. 10, 2004

(86) PCT No.: PCT/EP2004/014053

§ 371 (c)(1),
(2), (4) Date: Feb. 27, 2007

(87) PCT Pub. No.: WO2005/056322

PCT Pub. Date: Jun. 23, 2005

(65) Prior Publication Data

US 2007/0257509 A1    Nov. 8, 2007

(30) Foreign Application Priority Data

Dec. 12, 2003    (DE) ................... 103 58 752

(51) Int. Cl.
*B60J 5/06* (2006.01)
(52) U.S. Cl. ............................ 296/155; 49/358; 49/362
(58) Field of Classification Search .................. 296/155; 49/358, 362
See application file for complete search history.

(56) References Cited

U.S. PATENT DOCUMENTS

| | | |
|---|---|---|
| 5,581,944 A | 12/1996 | Kornbrekke et al. |
| 5,906,071 A | 5/1999 | Buchanan, Jr. |
| 6,036,259 A | 3/2000 | Hertel et al. |
| 6,174,020 B1 | 1/2001 | Knettle et al. |
| 6,286,740 B1 | 9/2001 | Hayashida |
| 6,550,232 B1 | 4/2003 | Achs et al. |

(Continued)

FOREIGN PATENT DOCUMENTS

DE    29706670    * 6/1997

(Continued)

OTHER PUBLICATIONS

English language Abstract, Translated Description and Claims of WO 99/54640, European Patent Office's esp@cenet.com database, 7pp.

(Continued)

*Primary Examiner*—Joseph D Pape
(74) *Attorney, Agent, or Firm*—Smith Law Office

(57) ABSTRACT

The invention relates to a sliding door system for a vehicle, in particular, a motor vehicle. The system comprises at least one sliding door (33A, 35B) that can be displaced along a track. The system is equipped with at least one power conduction device (1, 34, 35), which is connected at one end (3) to the sliding door (33A, 35B) and at the other end (2) to a fixed part of the vehicle. At least one section (4, 36) comprising articulated elements (5, 36), is situated between the two ends (1, 2) of the power conduction device. The system is equipped with at least one support (6, 13, 16, 18, 21, 38), along which the section or sections (4, 36) of the power conduction device are horizontally displaced.

11 Claims, 5 Drawing Sheets

U.S. PATENT DOCUMENTS

2002/0136471 A1 * 9/2002 Hermey et al. ................ 384/42

FOREIGN PATENT DOCUMENTS

| DE | 29706670 Y1 * | 9/1997 |
| DE | 198 32 044 A1 | 1/1999 |
| DE | 297 06 670 U1 | 7/1999 |
| EP | 0 173 829 | 7/1985 |
| EP | 0 846 599 B1 | 12/1997 |
| EP | 0 010 558 A2 | 11/1999 |
| EP | 1010558 * | 6/2000 |
| WO | WO99/54640 * | 10/1999 |
| WO | WO 99/54640 | 10/1999 |
| WO | WO 00/12913 | 3/2000 |

OTHER PUBLICATIONS

English language Abstract, Translated Description and Claims of EP 0 173 829, European Patent Office's esp@cenet.com database, 5pp.

* cited by examiner

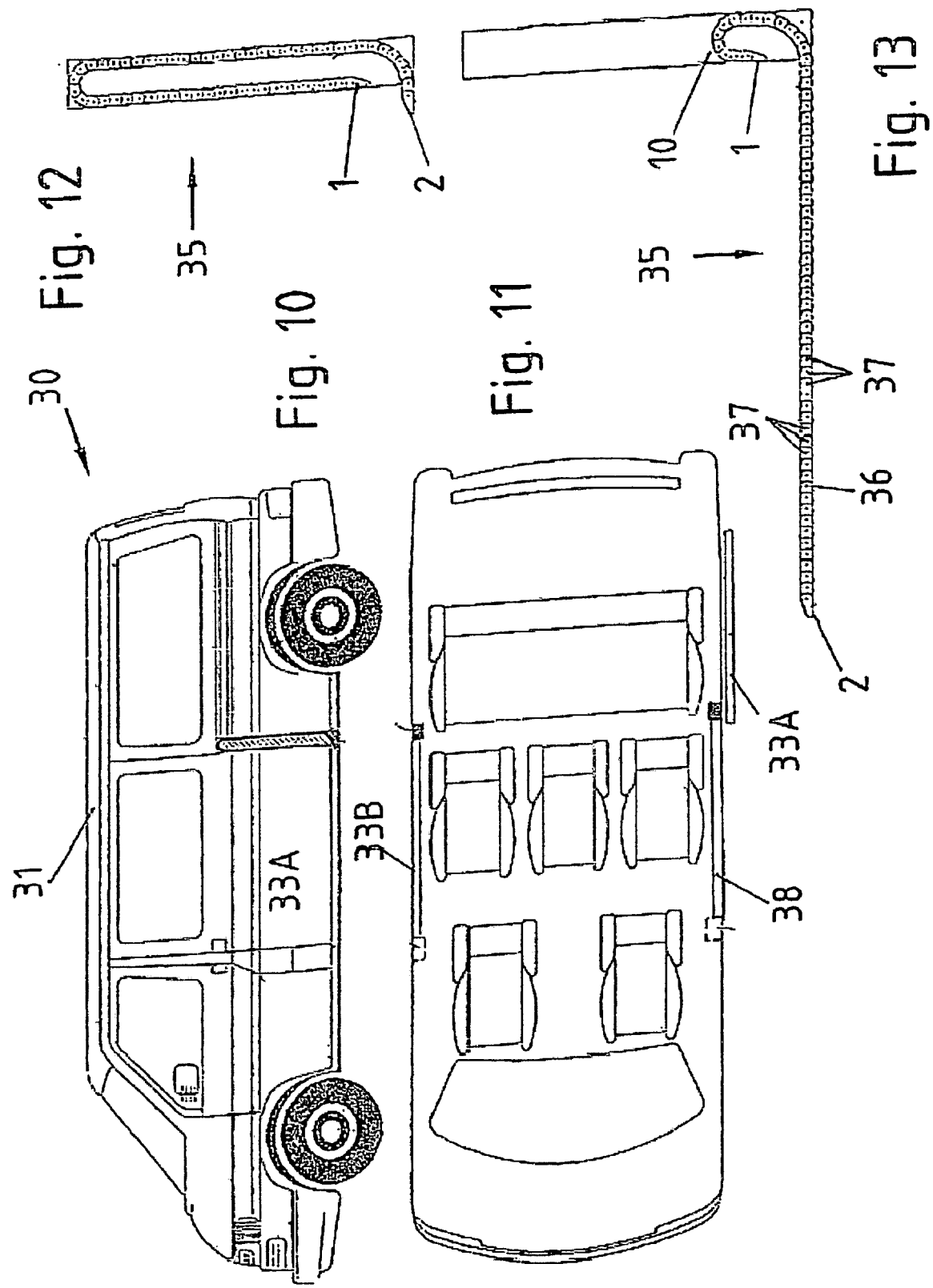

SLIDING DOOR SYSTEM FOR A VEHICLE, IN PARTICULAR A MOTOR VEHICLE

The object of the invention refers to a sliding door system for a vehicle, especially a motor vehicle.

BACKGROUND OF THE INVENTION

Passenger cars in the form of, for example, vans or minivans have enjoyed great popularity in recent times. Such passenger cars, because of their structural design, have at least one sliding door which permits easier access to the inside of the vehicle. Vans should provide a comfort which is comparable to that known for passenger cars. Therefore, components should be incorporated into the sliding door, for example, electrically opening windows, lights, loudspeaker boxes or closing mechanisms of a central locking system.

A sliding door system for a vehicle, especially for a motor vehicle, preferably for a passenger vehicle, has become known from EP 1 010 558 A2. This sliding door system comprises a sliding door which can be displaced along a track and at least one power conduction device which is joined at one end to the sliding door and at the other end to a fixed part of the chassis. The power conduction device is formed by articulated members. The power conduction device has an upper strip and a lower strip which are joined together by a curved section. A power conduction device which is suitable for use in a sliding door system is known from WO-A1-00/12913. The power conduction device is formed by components, each of which has two brackets at a distance from one another, lying opposite and extending in the longitudinal direction of the power conduction device, and these are connected with one another by at least one traverse. Each bracket has a joint body and a joint seat which run essentially transversely to the longitudinal direction of the power conduction device. A joint body of a bracket engages in the joint seat of a neighboring bracket. The joint body has two outer mantle areas which lie diametrically opposite. Similarly, the joint seat has two diametrically opposed inner mantle regions. The outer mantle regions and the inner mantle regions provide mobility of the chain links around an axis which runs essentially transversely to the longitudinal direction of the power conduction device.

SUMMARY OF THE INVENTION

Based on this, the present invention has the goal to provide a sliding door system which can be realized with simple means.

This goal is achieved by a sliding door system for a vehicle, especially for a motor vehicle, preferably for a passenger car, with the characteristics of Claim 1. Advantageous further developments and embodiments of the sliding door system are the objects of the dependent claims.

The sliding door system according to the invention has at least one sliding door which can be displaced along a track. Furthermore, a power conduction device is provided which is connected at one end to the sliding door and at the other end to a fixed part of the vehicle. Between the two ends of the power conduction device, there is at least one section provided which has elements that are joined together in an articulated manner. In the sliding door system according to the invention furthermore a support is provided on which at least the section of the power conduction device is movably positioned.

By this design of the sliding door system according to the invention, it is ensured that through the movement of the power conduction device, during the movement of the sliding door and the movement of the power conduction device as well, this device is moved only on a support. Thus, essentially the power conduction device is not in direct contact with the chassis of the vehicle at all. As a result of this, it is ensured that wearing away, for example of the coating layers of the chassis of the vehicle, is avoided in the region of movement of the power conduction device.

With the sliding door system according to the invention it is also achieved that known standard solutions or series of constructed power conduction devices can be utilized, because due to the supported arrangement of at least one section of the power conduction device, the joint regions do not require any special design.

If the power conduction device in a preferred embodiment is arranged so that it lies essentially in a horizontal plane, then the space requirement with regard to the height of construction is essentially determined only by the height of the elements of the power conduction device. This also provides the possibility of employing the design according to the invention in sliding door systems in which only a minimal height is available for installation.

The support is preferably a support which has at least two support elements arranged at a distance from one another. The support elements can have different cross-sectional shapes and profiles. Thus, for example, there can be limits on the sides through which the power conduction device is guided, at least over a part of its path. The support can also be made of one piece or one part.

According to a preferred embodiment of the sliding door system, it is proposed that these at least two support elements be arranged displaced with respect to one another. As a result of this measure, the cost for the design of the support is reduced. Hereby, as a result of this displaced arrangement of the support elements, the support elements used can be the same or different. The support can be built modularly by the support elements. Thus, for example, the supporting surface can be varied by several support elements arranged behind one another.

A design of a sliding door system is preferred in which the at least two support elements have a different length. By this measure it is achieved that even in the traveled state, that is in the extended state of the power conduction device, it will lie on the support.

In order to reduce wear as well as to facilitate handling of the sliding door system, according to a still further advantageous embodiment of the sliding door system, it is proposed that the support have a contact area with the power conduction device, whereby the support and/or the power conduction device are designed so that the frictional coefficient is low.

The contact area is preferably formed by a coating. As a result of this measure it is not absolutely necessary to provide the entire surface of the support element or support with a coating which has a low frictional coefficient. The power conduction device can also be provided with a corresponding coating. This is not absolutely necessary. There is also a possibility that the power conduction device be provided with means, at least partly, which reduce the friction between the power conduction device and the support.

According to a still further advantageous embodiment of the sliding door system, it is proposed that the support be formed by at least one profile. The profile can be, for example, an extruded profile.

In order to simplify the accessibility to components of the vehicle in the region of the power conduction device, according to a still further advantageous embodiment of the sliding door system, it is proposed that the support be joined to the vehicle separably. The separable joint can be produced, for example, by a mechanical joint. For this purpose, for example, the support can have fishbone-shaped bolts, which engage in corresponding openings in the chassis.

During the movement of the sliding door, the power conduction device is either under pressure or tension. Especially under a pressure load the power conduction device can under certain circumstances exhibit uncontrolled movement. In order to ensure that such uncontrolled movements of the power conduction device do not occur, according to an even further advantageous embodiment of the sliding door system, it is proposed that the power conduction device be guided in a guide channel. With this measure it is achieved that when the sliding door is closed the power conduction device is brought to a specific position.

The guide channel can be joined to the support. This is not absolutely necessary. A design is preferred in which the support is an integral part of the guide channel.

The end members of the power conduction device are preferably designed so that they have securing means. At least one end member of the power conduction device is preferably designed corresponding to the end member known from WO 00/12913. Such an end member has the advantage that it can be connected to the sliding door in a swivelable manner.

The line guidance unit is moved in a manner corresponding to the sliding movement of the sliding door. During this movement the lines which are arranged in the line guidance unit are exposed to tension. In order to minimize such tensional load, it is proposed that the line guidance unit have at least one tension release device for the line or lines which is or are guided in the power conduction device. If the line guidance unit is designed so that it has a relatively small cross section, then an embodiment is preferred in which the tension release device is positioned before the respective end of the line guidance unit.

The line guidance unit is arranged preferably in the floor or roof region of the chassis of the vehicle. The decision about whether the line guidance unit should be arranged in the floor or in the roof area, depends on the structure of the vehicle. Hereby attention should be paid to the fact that any lines should be able to be exchanged or additional lines should be able to be introduced for other components in the line guidance unit. There is also the possibility of providing the line guidance unit correspondingly with lines which have all the connection possibilities for possible users within the sliding door.

Further advantages and details of the invention are explained with the aid of the practical examples shown in the drawing, without the object of the invention being limited to these concrete practical examples.

The following are shown:

BRIEF DESCRIPTION OF THE DRAWINGS

FIG. 10 is a third practical example of an arrangement of a line guidance unit in a vehicle, FIG. 11 shows the vehicle according to FIG. 9 schematically in top view with line guidance units, FIG. 12 shows a line guidance unit with the sliding door closed, and FIG. 13 shows a line guidance unit with the sliding door open with an arrangement in the vehicle according to FIG. 10.

DETAILED DESCRIPTION OF THE INVENTION

Figure 1:
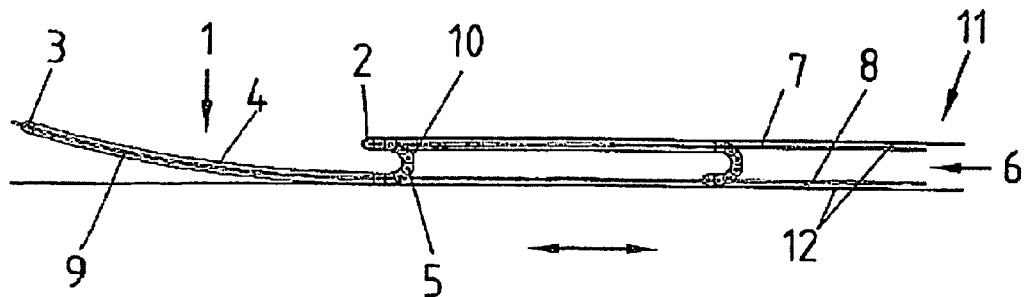
FIG. 1 is a schematic top view of a first practical example of a power conduction device with a support for a sliding door system.

FIG. 1 shows a first practical example of a power conduction device with a support of a sliding door system. For the sake of clarity, the sliding door, as well as the vehicle and the chassis of the vehicle are not shown.

The power conduction device 1 has a first end 2 and a second end 2 [sic—should be 3]. Between ends 2, 3 a section 4 is provided which has linked-together elements 5. The articulated elements can be formed by links.

The first end 2 is connected to a fixed part of the vehicle. The second end 3 is connected to the sliding door, which is not shown.

According to the representation in FIG. 1, a support 6 is provided which is formed by two support elements 7, 8. The support elements 7, 8 are arranged at a distance from one another. The support element 7 is designed to be shorter than support element 8. This support element 8 has a curved section 9 on which the power conduction device also slides. The power conduction device 1 and the support 6 are arranged so that at least section 4 of the power conduction device 1 can be moved in the lying position.

The arrow shown in FIG. 1 indicates the direction of movement of the power conduction device 4 [sic—should be 1] together with the sliding door which is not shown. The power conduction device 1 has a curved region 10. In the closed state of the sliding door, the curved region 10 lies in the left section of FIG. 1. In the open state of the sliding door the curved section 10 lies in the right portion of FIG. 1.

During an opening process, the power conduction device 1 experiences pressing forces. In order to ensure that the power conduction device does not perform any uncontrolled movement or come into contact with other parts, especially with the structural components of the vehicle, a guide channel 11 is provided. The guide channel 11 is delineated by side walls 12.

Figure 2:
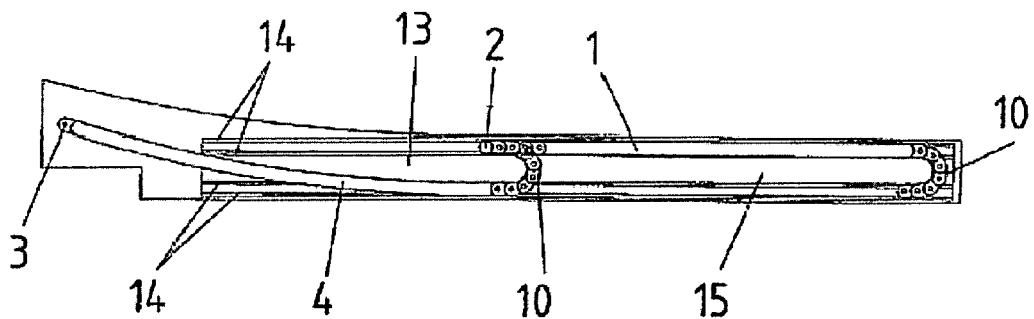
FIG. 2 is a schematic top view of a second practical example of a power conduction device with support.

FIG. 2 shows a second practical example of a power conduction device with a support for a sliding door system. The power conduction device 1 is shown schematically. FIG. 2 shows the two end positions of the power conduction device 1, which it assumes when the sliding door, which is not shown, is opened or closed. During this process, the power conduction device 1, which has at least one section 4 formed by articulated elements, slides the power unit 1 on a support 13. Preferably, the support 13 is separably connected to a chassis of the vehicle.

In order to reduce the frictional forces, the support 13 has ribs 14 which protrude from a base body 15 of the support 13. Support 13 is designed essentially horizontally.

In the practical example shown, in each case two pairs of ribs 14 are shown in FIG. 2. The distance between the two ribs 14 which form a pair of ribs and the thickness of the ribs 14 is chosen so that the power guide chain 1 always lies on it.

Figure 3:
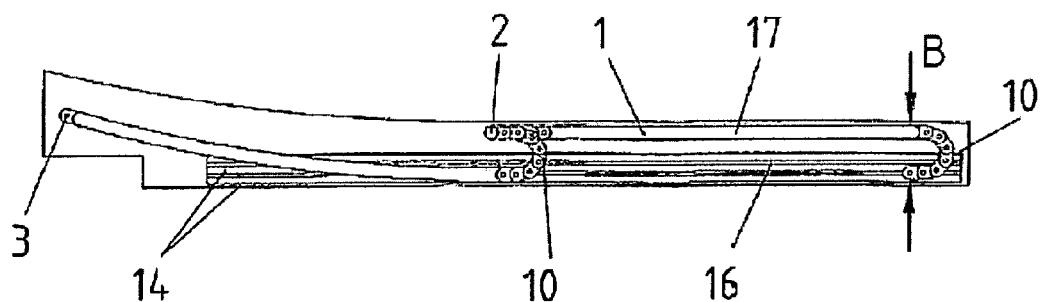
FIG. 3 is a third practical example of a power conduction device with support for a sliding door system.

FIG. 3 shows a third practical example of a power conduction device with a support of a sliding door system. In this practical example, a support 16 is provided which has ribs 14. The power conduction device slides on these ribs 14. The width of support 16 is smaller than the width B of the power conduction device. In the open state, the strip 17 of the power conduction device is hangs free. A part of the curved region 10 lies on support 16 when the sliding door is open, and this is shown in the right part of FIG. 3. Optionally, under the strip 17, supporting elements can be present which support the power conduction device 1 locally.

Figure 4:
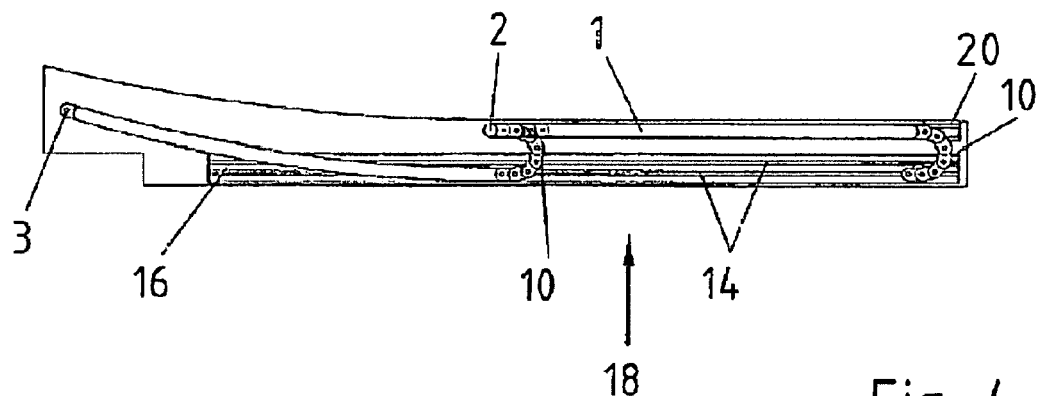
FIG. 4 is a fourth practical example of a power conduction device with support for a sliding door system.

Instead of local supporting elements, another supporting element can be provided. Such a design in shown in FIG. 4.

The support 18 is formed by a supporting element 19, which corresponds essentially to the support 16 according to FIG. 3.

A supporting element 20 corresponds from the constructional point of view essentially to the supporting element 19 whereby the supporting element 20 is designed to be shorter and narrower in comparison to supporting element 19.

Figure 5:
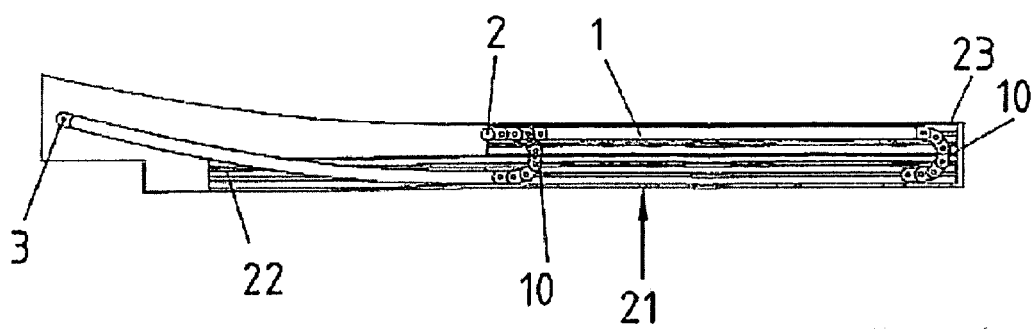
FIG. 5 is a fifth practical example of a power conduction device with support for a sliding door system.

FIG. 5 shows a still further practical example of a power conduction device 1 in combination with a support 21. The support 21 is formed by supporting elements 22, 23. The supporting elements 22, 23 are designed as profile bodies. They have ribs 14 which run parallel to one another on which the power guidance device lies and is moved during a sliding process of the sliding door. The supporting elements 22, 23 are made of a profiled part and are cut to the desired length by deflecting the profile. FIG. 5 also shows the power conduction device 1 in the two end positions.

The practical examples shown in FIGS. 2 to 5 can also have guide channels through which the power conduction device 1 is guided at least partly.

Figure 6:
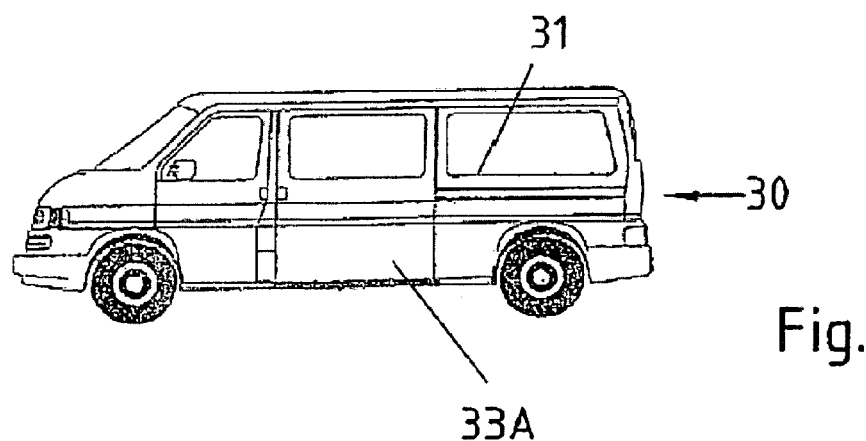
FIG. 6 is a vehicle in a side view.
Figure 7:
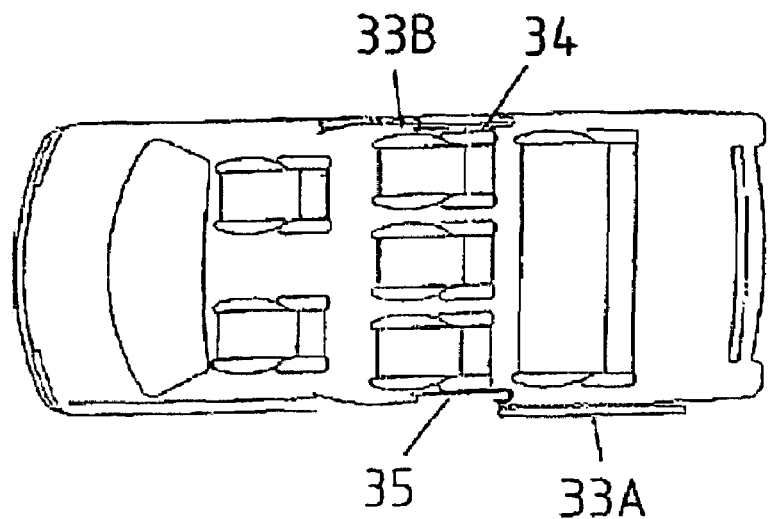
FIG. 7 shows the vehicle according to FIG. 5 in a top view with line guidance units.

FIG. 6 shows a vehicle 30, as an example, which as a chassis 31 as well as two sliding doors 33A, 33B that can be slid in the longitudinal direction of the vehicle, as can be seen from FIG. 7. In the region of floor 32 a line guidance unit 35 is arranged for each sliding door 33A, 33B. The line guidance unit 35 has a section which is designed in the form of a chain with several links joined together. The links can be swiveled around the axis of the joint. The line guidance unit 35 is arranged essentially in a horizontal plane. The links can be swiveled around the axes of the joints, which run essentially perpendicular to the horizontal plane.

The line guidance unit has a first end which is connected to the chassis. The first end forms a fixed connection. The second end is connected to the sliding door 33A or 33B. This second end forms a moveable connection. In order to connect the first end to the chassis, the power guidance device has a connecting link. To connect the second end to a sliding door 33A, 33B, the power guidance device has a correspondingly designed connecting link. In the practical example shown, the power guidance devices for the two sliding doors 33A, 33B are designed identically. This is not absolutely necessary.

FIG. 7 shows the right sliding door 33B looking in the direction of the vehicle, in the closed state. In the closed state of the sliding door, the power guidance device 34 assumes a position which is shown in FIG. 7.

Looking in the direction of the vehicle, the left sliding door 33A is in an open position.

Figure 8:
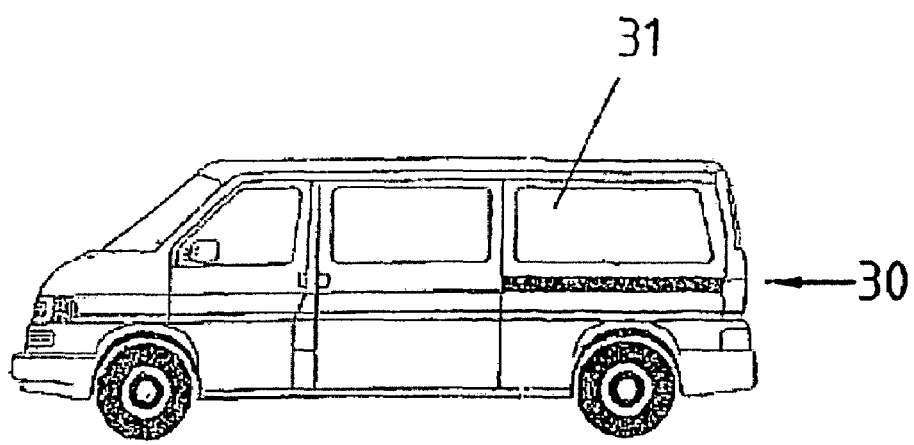
FIG. 8 is a vehicle with a second arrangement of a line guidance unit in a side view.
Figure 9:
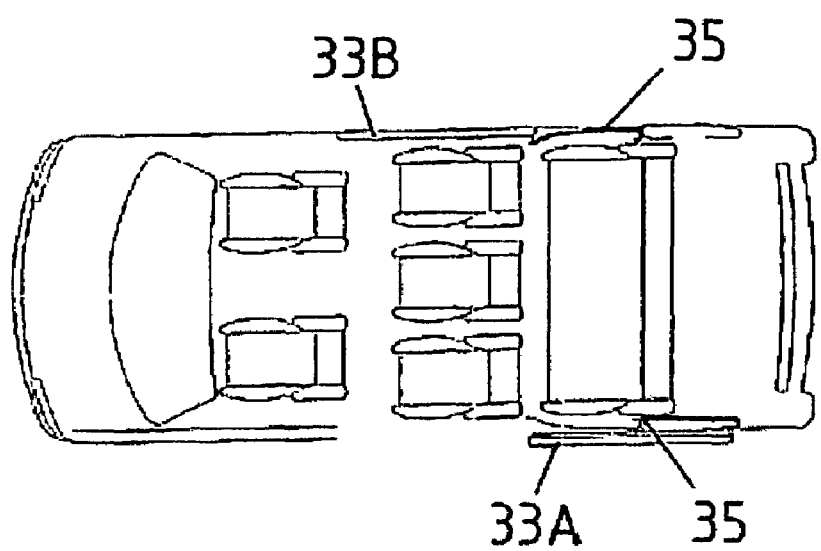
FIG. 9 is the top view of the vehicle according to FIG. 8.

FIGS. 8 and 9 show another arrangement of a power guidance device in a vehicle 30. The power guidance device 35 is arranged in a side wall 36 of the vehicle's chassis 32. It extends essentially in a line parallel to the longitudinal axis of vehicle 30.

During an opening process of a sliding door, the sliding door is moved transversely to the longitudinal direction of the vehicle. This movement is transferred to the power conduction device 35 arranged in the lying position. The power conduction device 35 also moves transversely to the longitudinal direction of the vehicle. Then an essentially straight line movement of the sliding door takes place in the longitudinal direction.

FIGS. 10 and 11 show yet another possible arrangement of a power conduction device. The power conduction device is preferably designed corresponding to the practical example shown in FIG. 1.

FIGS. 10, 11 show the position of the power conduction device. The power conduction devices are positioned behind sliding doors 33A, 33B. Alternatively, the power conduction device of sliding door 33A, 33B can be arranged in the front, as it is shown in FIG. 10 with the dotted lines. In such an arrangement of the power conduction device 35, the representation of the power conduction device 35 in FIG. 12 corresponds essentially to the closed state of sliding door 33B, while FIG. 13 would show an open state of the sliding door 33A. The arrangement of the power conduction device 35 behind sliding door 33A, 33B, as shown in FIG. 10, is to be preferred, because in such an arrangement, links 37 of section 36 can be designed so that they have to be swivelable only in one direction from an essentially extended horizontal position.

The power conduction device slides on a support 38 during the opening and closing process.

The power conduction devices shown in the drawing are formed of elements joined together in a linked manner, whereby the elements consist of links. This is not absolutely necessary. It is also possible that the section of the power conduction device be formed between the ends by a flexible cord with a polygonal cross section. The flexible cord has a channel which extends in the longitudinal direction of the cord. The cord is divided by gaps. The gaps run essentially parallel to one another. They completely separate a side wall and partially a top wall and a bottom wall. They end some distance in front of a back wall. Due to the gap and the flexible design of the cord, it is bendable, whereby adjacent elements can be swiveled around a common axis. In order to facilitate the introduction of lines, cables or similar into the channel, one side wall can be designed with a slit.

The support on which the power guidance device slides can be made of different materials. Preferably the support is designed from plastic. Optionally the support can have contact regions with the power conduction device which are coated.

As a result of the power conduction device being arranged in the lying position, the power conduction device does not require a special design, so that standard solution of known power conduction devices can be used, which can result in economical advantages.

REFERENCE LIST

1 Power conduction device
2 First end
3 Second end
4 Section
5 Element
6 Support
7 Support element
8 Support element
9 Section
10 Curved region
11 Guide channel
12 Side wall
13 Support
14 Rib
15 Base body
16 Support
17 Strip
18 Support
19 Support element
20 Support element
21 Support
22 Support element
23 Support element
30 Vehicle
31 Chassis
32 Floor
33A, 33B Sliding door
34 Power conduction device 35 Power conduction device
36 Section
37 Links
38 Support

The invention claimed is:

1. A sliding door system for a vehicle, especially a motor vehicle, comprising:
   a sliding door;
   a track along which the sliding door can be moved; and
   a power conduction device having a first end joined to the sliding door and a second end joined to a fixed part of the vehicle, and an articulated section between the first and second ends of the power conduction device; and
   a support on which the articulated section can be moved.

2. The sliding door system according to claim 1, wherein the support comprises a plurality of support elements arranged at a distance to one another.

3. The sliding door system according to claim 2, wherein the support elements are arranged displaced with respect to one another.

4. The sliding door system according to claim 2, wherein the support elements have different lengths.

5. The sliding door system according to claim 1, wherein the support has a contact region with the power conduction devices, and the contacting region has a low frictional coefficient.

6. The sliding door system according to claim 5, wherein the contact region is formed by a coating on the support.

7. The sliding door system according to claim 1, wherein the support comprises a profiled part.

8. The sliding door system according to claim 1, wherein the support is releasably joined to the vehicle.

9. The sliding door system according to claim 1, wherein the power conduction device is arranged in a guide channel.

10. The sliding door system according to claim 9, wherein the support is connected to the guide channel.

11. The sliding door system according to claim 10, wherein the support is an integral part of the guide channel.

* * * * *

UNITED STATES PATENT AND TRADEMARK OFFICE
CERTIFICATE OF CORRECTION

PATENT NO. : 7,452,026 B2
APPLICATION NO. : 10/582371
DATED : November 18, 2008
INVENTOR(S) : Herbert Wehler and Uwe Kemper Page 1 of 1

It is certified that error appears in the above-identified patent and that said Letters Patent is hereby corrected as shown below:

Title Page; item (56);

In References Cited:

At page 2, "DE 29706670 Y1 9/1997" should be -- DE 29706670 U1 6/1997 --.

At page 2, "DE 297 06 670 U1 7/1999" should be -- DE 297 06 670 U1 7/1997 --.

At page 2, "EP 0 010 558 A2" should be -- EP 1 010 558 A2 --.

In the Specification:

At column 8, line 5, "devices" should be -- device --.

Signed and Sealed this

Twenty-fourth Day of March, 2009

JOHN DOLL
*Acting Director of the United States Patent and Trademark Office*